(12) United States Patent
Gotanda et al.

(10) Patent No.: US 6,795,123 B2
(45) Date of Patent: Sep. 21, 2004

(54) INTERPOLATION APPARATUS, AND VIDEO SIGNAL PROCESSING APPARATUS INCLUDING THE SAME

(75) Inventors: Chikara Gotanda, Takatsuki (JP); Hideto Nakahigashi, Takatsuki (JP); Yuichi Ishikawa, Ibaraki (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 495 days.

(21) Appl. No.: 10/028,545

(22) Filed: Dec. 19, 2001

(65) Prior Publication Data

US 2002/0080269 A1 Jun. 27, 2002

(30) Foreign Application Priority Data

Dec. 22, 2000 (JP) ........................................ 2000-390074

(51) Int. Cl.[7] .................................................. H04N 7/01
(52) U.S. Cl. ....................................................... 348/448
(58) Field of Search ................................. 348/448, 441, 348/451, 452, 458, 459; H04N 7/01, 11/20

(56) References Cited

U.S. PATENT DOCUMENTS

| | | | | | |
|---|---|---|---|---|---|
| 5,796,437 | A | * | 8/1998 | Muraji et al. | 348/452 |
| 5,959,681 | A | * | 9/1999 | Cho | 348/452 |
| 6,141,056 | A | * | 10/2000 | Westerman | 348/448 |
| 6,262,773 | B1 | * | 7/2001 | Westerman | 348/447 |

* cited by examiner

Primary Examiner—Sherrie Hsia

(57) ABSTRACT

An interpolation apparatus that generates interpolation pixel values necessary for converting input video data of interlace scanning into video data of progressive scanning is provided. A plurality of candidate pixel-pairs each of which is composed of two pixels that are symmetric with respected to a pixel that is going to be interpolated are selected from pixels on adjacent two scan lines within one field of the input video data, and a difference between pixel values of each selected pixel-pair is calculated. A pixel-pair to be used for generating the interpolation pixel value is determined, based on the smallest difference and the second smallest difference of the calculated differences. An interpolation pixel value of the pixel that is going to be interpolated is generated based on pixel values of the determined pixel-pair.

20 Claims, 12 Drawing Sheets

INTERPOLATION APPARATUS, AND VIDEO SIGNAL PROCESSING APPARATUS INCLUDING THE SAME

BACKGROUND OF THE INVENTION (1) Field of the Invention

The present invention relates to an interpolation apparatus that generates interpolation pixel values necessary for converting input video data of interlace scanning into video data of progressive scanning, and to a video signal processing apparatus including the interpolation apparatus. In particular, the present invention relates to improvements in interpolation processing.

(2) Related Art

Scan line conversion techniques for converting an input video signal of interlace scanning into a video signal of progressive scanning can be roughly categorized into two types: "inter-field interpolation" and "intra-field interpolation". Inter-field interpolation generates an interpolation scan line using a video signal of a preceding field, whereas intra-field interpolation generates an interpolation scan line using a video signal within a present field. Intra-field interpolation is employed more frequently due to its simple interpolation processing.

An I/P conversion circuit, one example of which is shown in FIG. 1, is conventionally known as a technique to realize intra-field interpolation.

As the figure shows, the I/P conversion circuit 110 includes an input terminal 100, a line memory 101, a pixel difference detection circuit 102, a correlation direction detection circuit 103, an interpolation pixel generation circuit 104, and a time axis conversion circuit 105.

An interlaced video signal (X1) is inputted into the input terminal 100. The input video signal (X1) is transmitted to the line memory 101, the pixel difference detection circuit 102, and the interpolation pixel generation circuit 104.

The line memory 101 delays the video signal (X1) transmitted from the input terminal 100 for a time period corresponding to one scan line (1-line), and outputs the delayed video signal as a 1-line delay signal (X2), to the pixel difference detection circuit 102 and the time axis conversion circuit 105.

The processing described above enables adjacent two lines within one field of the interlaced video signal to be inputted into the pixel difference detection circuit 102.

The pixel difference detection circuit 102 selects, from pixels on the adjacent two lines, a plurality of pixel pairs each including two pixels that are respectively on the adjacent two lines and that are symmetric with respect to a position of a pixel that is going to be interpolated (hereafter, a "pixel that is going to be interpolated" is referred to as an "interpolation pixel"). The pixel difference detection circuit 102 calculates a difference in luminance between two pixels (hereafter referred to as a "luminance difference") in each selected pixel pair. The pixel difference detection circuit 102 then outputs each calculated luminance difference as a pixel difference detection signal (X3) for the interpolation pixel.

The correlation direction detection circuit 103 selects a pixel pair with the smallest luminance difference, using the pixel difference detection signal outputted from the pixel difference detection circuit 102. The correlation direction detection circuit 103 then detects a direction of a straight line that links the two pixels in the selected pair, and outputs a signal indicating the detected direction as a correlation direction signal (X4).

The interpolation pixel generation circuit 104 determines the two pixels that are respectively on the two lines and that are in the direction with the smallest luminance difference, using the video signal (X1), the 1-line delay signal (X2), and the correlation direction signal (X4). The interpolation pixel generation circuit 104 averages the luminance of the determined two pixels, and sets the averaged value as an interpolation value for the interpolation pixel.

The interpolation value being generated by averaging the luminance of the two pixels positioned in such a direction that has the smallest luminance difference is due to the following reason.

A sequence of pixels with similar luminance is most likely to extend in the direction of the straight line that links the two pixels with the smallest luminance difference. Being positioned on the straight line that links the two pixels, i.e., positioned on the sequence of the pixels with similar luminance, the interpolation pixel must have the highest correlation with the two pixels with the smallest luminance difference. Therefore, it is considered most appropriate to generate an interpolation value based on the luminance of these two pixels. The direction in which a pixel pair with the smallest luminance difference is positioned with respect to the interpolation pixel is hereafter referred to as the "correlation direction".

The pixel difference detection circuit 102, the correlation direction detection circuit 103, and the interpolation pixel generation circuit 104 sequentially execute the above described processing on each pixel to be interpolated, and outputs an interpolation signal (X5) that indicates the generated interpolation values of the interpolation pixels.

The time axis conversion circuit 105 receives the 1-line delay signal (X2) and the interpolation signal (X5), and sequentially subjects the 1-line delay signal (X2) and the interpolation signal (X5) to the time compressed integration process, to output a progressive scanned video signal (X6).

The processing describe above enables the interpolation signal (X5) to be generated using the video signal (X1) and the 1-line delay signal (X5), and the interpolation line to be inserted at the interpolation line position.

With the interpolation described above, an interpolation pixel can be generated based on pixels positioned in such a direction that has the highest correlation with the interpolation pixel, thereby improving an image quality, compared with when an interpolation pixel is generated based on pixels that are not correlated with the interpolation pixel.

This interpolation, however, may be flawed because a direction with the smallest luminance difference is always set as the correlation direction. The problem may arise, for example, when the luminance of one pixel in the direction detected as the correlation direction with the smallest luminance difference is being influenced by noise. In this case, a completely wrong direction may be set as the correlation direction. If this happens, an interpolation pixel is generated based on pixels that are not correlated with the interpolation pixel, resulting in the interpolation contrarily deteriorating the image quality.

Further, in the case of a still image area, an interpolation line can be actually reconstructed using an input video signal of a field preceding the present field that includes interpolation pixels. Despite this fact, however, the above interpolation has conventionally been performed regardless of whether an interpolation pixel is in a still image area or in a moving image area with high motion. This creates unnecessary possibility of deteriorating the image quality due to the interpolation performed with being influenced by noise, even when an interpolation pixel is in a still image area.

SUMMARY OF THE INVENTION

In view of the above problem, a first object of the present invention is to provide an interpolation apparatus that can minimize image quality deterioration caused by noise influence on interpolation.

A second object of the present invention is to provide a video signal processing apparatus that can minimize image quality deterioration caused by noise influence on interpolation in a moving image area, and can nearly eliminate image quality deterioration caused by noise influence on interpolation in a still image area, by incorporating the interpolation apparatus therein.

The first object of the present invention can be achieved by an interpolation apparatus that generates interpolation pixel values necessary for converting input video data of interlace scanning into video data of progressive scanning, the interpolation apparatus including: a selection unit for selecting, from pixels on adjacent two scan lines within one field of input video data, a plurality of candidate pixel-pairs, each of which is composed of two pixels that are symmetric with respect to a position of a pixel that is going to be interpolated; a calculation unit for calculating a difference between pixel values of each selected candidate pixel-pair; and a generation unit for (a) determining, from the selected candidate pixel-pairs, a pixel-pair to be used for generating an interpolation pixel value of the pixel that is going to be interpolated, based on a smallest difference and a 2nd smallest difference of the calculated differences, and (b) generating the interpolation pixel value, based on pixel values of the determined pixel-pair.

With this construction, an interpolation value is generated based on the difference between the smallest difference and the $2^{nd}$ smallest difference. By setting in advance such ranges of the smallest difference and the $2^{nd}$ smallest difference where pixel values of pixels positioned in a direction with the smallest difference are highly likely to have been influenced by noise, interpolation based on the pixels in the direction with the smallest difference can be prevented when the smallest difference and the $2^{nd}$ smallest difference are respectively in the set ranges. Accordingly, noise influence on interpolation can be decreased, thereby decreasing the image quality deterioration.

The second object of the present invention can be achieved by a video signal processing apparatus that converts input video data of interlace scanning into video data of progressive scanning, the video signal processing apparatus including: a selection unit for selecting, from pixels on adjacent two scan lines within one field of input video data, a plurality of candidate pixel-pairs, each of which is composed of two pixels that are symmetric with respect to a position of a pixel that is going to be interpolated; a calculation unit for calculating a difference between pixel values of each selected candidate pixel-pair; a first generation unit for (a) determining, from the selected candidate pixel-pairs, a pixel-pair to be used for generating an interpolation pixel value of the pixel that is going to be interpolated, based on a smallest difference and a $2^{nd}$ smallest difference of the calculated differences, and (b) generating the interpolation pixel value, based on pixel values of the determined pixel-pair; a second generation unit for generating an interpolation pixel value of the pixel that is going to be interpolated, by referring to a pixel value of a pixel that corresponds to the pixel to be interpolated and that is in a field immediately preceding a present field to which the pixel to be interpolated belongs; a detection unit for detecting a change in an image of the present field, by referring to the field immediately preceding the present field and a field immediately following the present field; a selection unit for selecting, according to a detection result by the detection unit, one of (c) the interpolation pixel value generated by the first generation unit and (d) the interpolation pixel value generated by the second generation unit; and an output unit for alternately outputting (e) scan lines interpolated using interpolation pixel values selected by the selection unit and (f) scan lines of the input video data.

With this construction, one of (a) the pixel value generated by the first generation unit and (b) the pixel value generated by the second generation unit can be selected for use in interpolation, in accordance with a change in an image. For example, when the interpolation pixel is in a still image area, the pixel value generated by the second generation unit is selected for use in interpolation. This enables interpolation to be performed without noise influence in a still image area. Therefore, an image quality can be improved.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings.

DESCRIPTION OF THE PREFERRED EMBODIMENTS

The following describes preferred embodiments of an interpolation apparatus and a video signal processing apparatus relating to the present invention, with reference to the drawings.

(First Embodiment)

Figure 1:
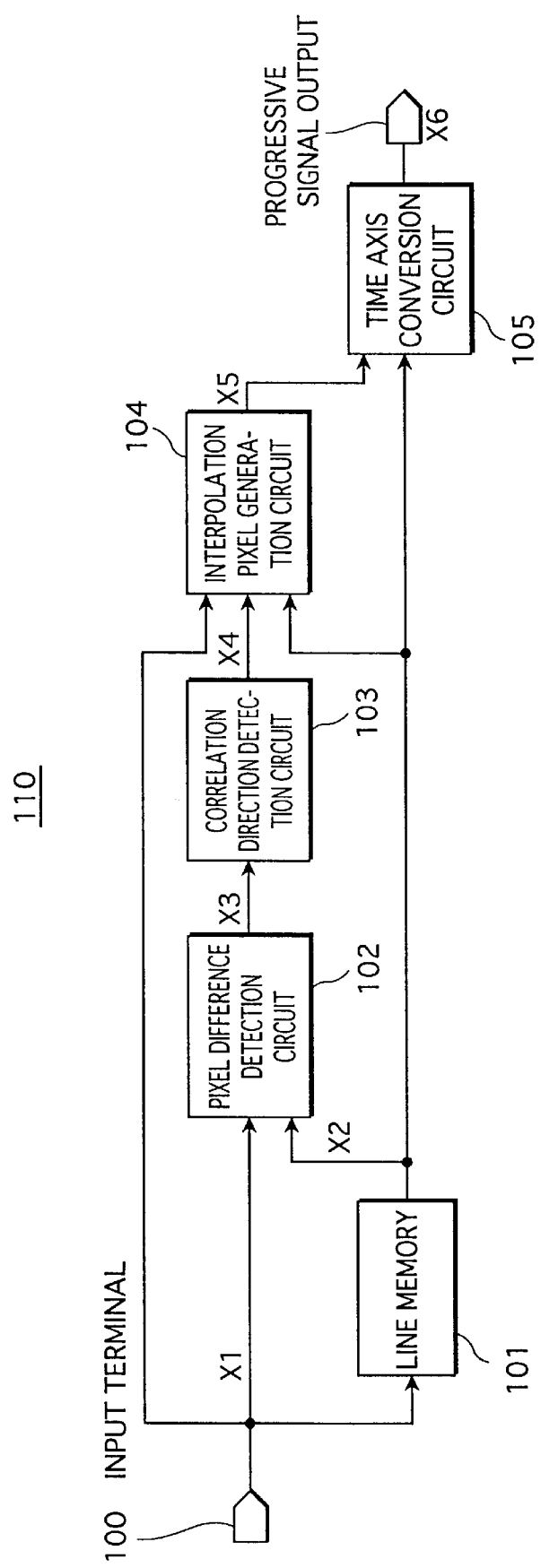
FIG. 1 shows an example construction of an I/P conversion apparatus incorporated in a conventional television set.
Figure 2:
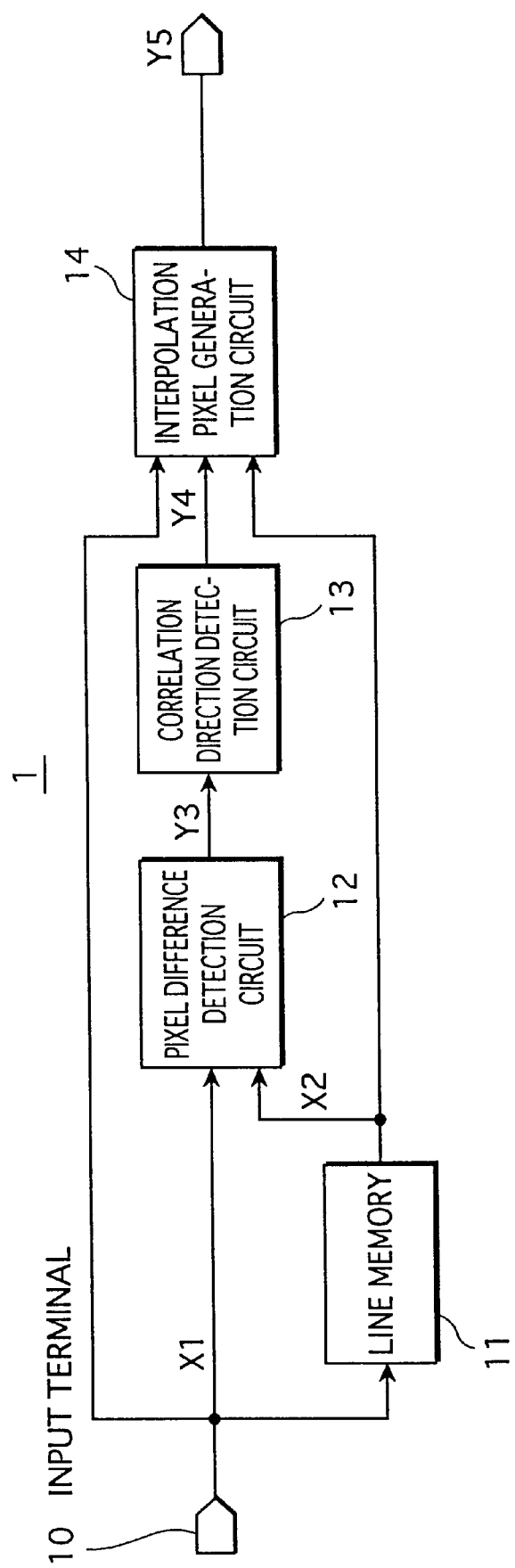
FIG. 2 shows an example construction of an interpolation circuit included in a video signal processing circuit in a television set relating to a first embodiment of the present invention.

FIG. 2 shows an example construction of an interpolation apparatus (hereafter referred to as an "interpolation circuit" included in a video signal processing apparatus in a television set.

As the figure shows, the interpolation circuit 1 includes an input terminal 10, a line memory 11, a pixel difference detection circuit 12, a correlation direction detection circuit 13, and an interpolation pixel generation circuit 14. The interpolation circuit 1 is a circuit for generating an interpolation signal by intra-field interpolation. The interpolation circuit 1 is characterized by the construction of the correlation direction detection circuit 13. The other components, the input terminal 10 and the pixel difference detection circuit 12 etc., have basically the same functions as those described in the related art in this specification.

An interlaced video signal (X1) is inputted into the input terminal 10. The input video signal (X1) is transmitted to the line memory 11, the pixel difference detection circuit 12, and the interpolation pixel generation circuit 14.

The line memory 11 delays the video signal (X1) transmitted from the input terminal 10 for a time period corresponding to 1-line, and outputs the delayed video signal as a 1-line delay signal (X2), to the pixel difference detection circuit 12 and the interpolation pixel generation circuit 14. The outputted 1-line delay signal (X2) is synchronized with the video signal (X1), and therefore, the 1-line delay signal of each pixel is sequentially outputted in synchronization with the video signal (X1) of the corresponding pixel.

The processing described above enables the interlaced video signal of pixels on adjacent two lines to be sequentially inputted into the pixel difference detection circuit 12.

The pixel difference detection circuit 12 selects, from the pixels on the adjacent two lines, a plurality of pixel pairs each including two pixels that are respectively on the adjacent two lines and that are symmetric with respect to a position of an interpolation pixel. The pixel difference detection circuit 12 calculates here a difference in luminance between two pixels (a luminance difference) in each selected pair. The pixel difference detection circuit 12 then outputs each calculated luminance difference as a pixel difference detection signal (Y3) for the interpolation pixel.

Figure 3:
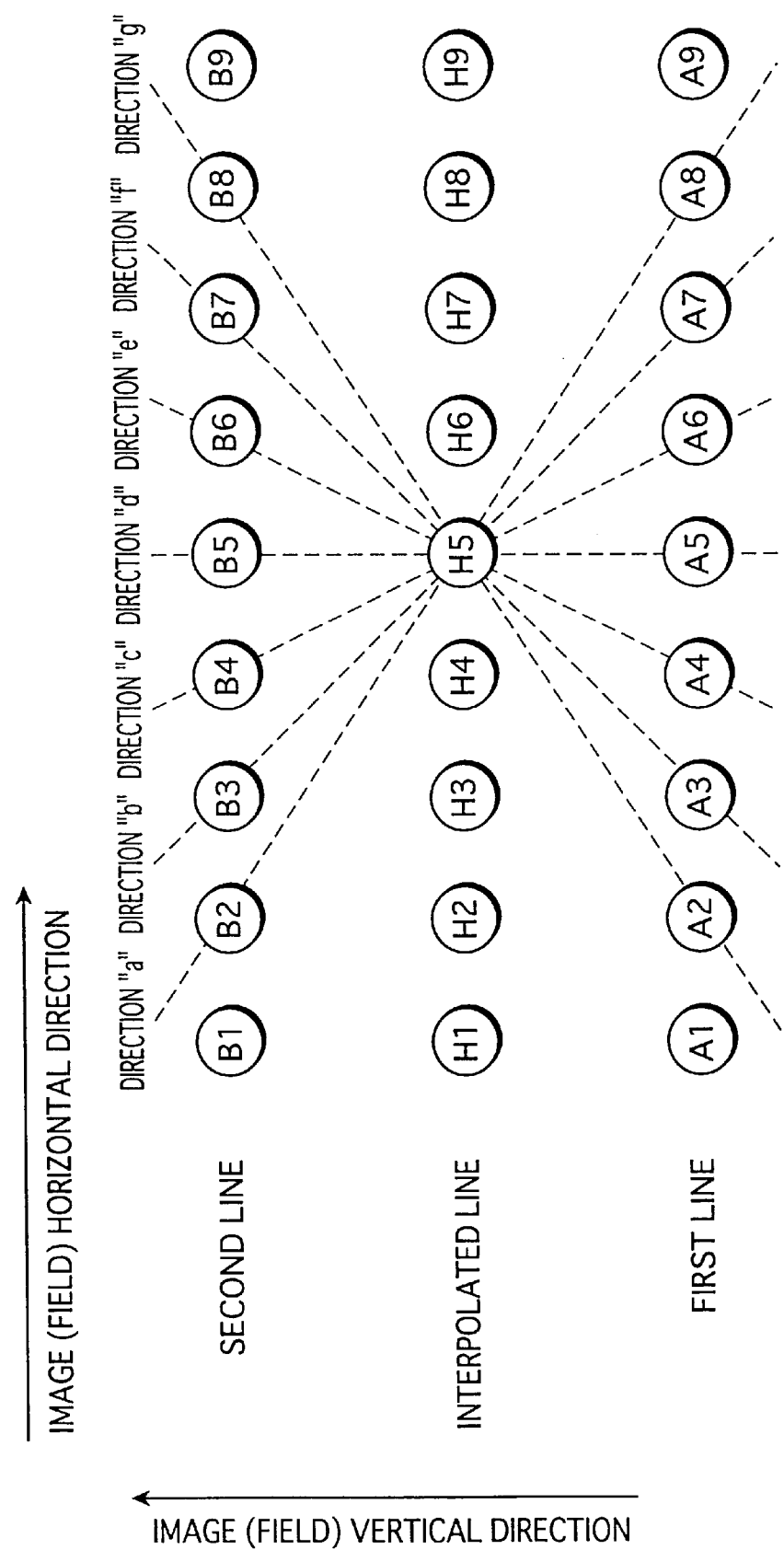
FIG. 3 is a schematic view for explaining in detail an example processing performed by a pixel difference detection circuit in the interpolation circuit.

FIG. 3 is a schematic view for explaining in detail an example processing performed by the pixel difference detection circuit 12.

In the figure, the adjacent two lines are respectively referred to as a first line represented by the present video signal (XI), and a second line represented by the 1-line delay signal (X2). Pixels on the first line are referred to as pixels "A1" to "A9". Pixels on the second line are referred to as pixels "B1" to "B9". Pixels on an interpolation line that is a missing line to be interpolated between the first line and the second line are referred to as interpolation pixels "H1" to "H9". Here, the interpolation pixel is assumed to be a pixel "H5". In the figure, pixel pairs each including two pixels that are respectively on the second line and the first line and that are symmetric with respect to a position of the interpolation pixel "H5" are pairs of: pixels "B2" and "A8"; pixels "B3" and "A7"; pixels "B4" and "A6"; pixels "B5" and "A5"; pixels "B6" and "A4"; pixels "B7" and "A3"; and pixels "B8" and "A2". Directions of the straight lines that link every two pixels in the above pairs are respectively referred to as directions "a" to "g". Here, pixels that are given the same numerical value are assumed to have the same horizontal position.

The pixel difference detection circuit 12 selects pairs of pixels positioned on the first and second lines in the directions "a" to "g". The pixel difference detection circuit 12 then calculates a luminance difference in each selected pair. For example, a luminance difference of a pixel pair in the direction "a" is calculated as absolute value of luminance of the pixel "B2"—absolute value of luminance of the pixel "A8". Also, a luminance difference of a pixel pair in the direction "b" is calculated as absolute value luminance of the pixel "B3"—absolute value of luminance of the pixel "A7".

The pixel difference detection circuit 12 outputs signals "Y3a" to "Y3g" each associating a calculated luminance difference with its direction, as the pixel difference detection signal (Y3) for the interpolation pixel "H5". For example, the signal "Y3a" includes a signal indicating the calculated luminance difference in the direction "a" and a signal indicating the direction "a".

Referring back to FIG. 2, the correlation direction detection circuit 13 receives the pixel difference detection signal (Y3), and detects the smallest difference (hereafter referred to as the value "L1") and the second smallest difference (hereafter referred to as the value "L2"), out of the luminance differences indicated by the received pixel difference detection signal (Y3). The correlation direction detection circuit 13 then detects a direction corresponding to a pixel pair to be used for generating the interpolation pixel "H5", based on the detected smallest and second smallest differences, as the correlation direction. The correlation direction detection circuit 13 then outputs a signal indicating the detected direction (a correlation direction signal (Y4)) to the interpolation pixel generation circuit 14. The construction of the correlation direction detection circuit 13 is described later.

The interpolation pixel generation circuit 14 determines (a) a pixel on the first line and (b) a pixel on the second line that are positioned in the direction indicated by the correlation direction signal (Y4). The interpolation pixel generation circuit 14 then averages the luminance of the determined two pixels, and sets the averaged value as an interpolation value. For example, when the correlation direction signal (Y4) indicates the direction "b", the interpolation pixel generation circuit 14 sets the averaged luminance of the pixels "B3" and "A7" as an interpolation value. When the correlation direction signal (Y4) indicates the direction "d", the interpolation pixel generation circuit 14 sets the averaged luminance of the pixels "B5" and "A5" as an interpolation value.

The pixel difference detection circuit 12, the correlation direction detection circuit 13, and the interpolation pixel generation circuit 14 sequentially execute the above processing on each of interpolation pixels, i.e., interpolation pixels "H1" to "H9" in the figure. This processing enables interpolation pixels for interpolation pixels to be generated one after another, and to be outputted from the interpolation pixel generation circuit 14 as an interpolation signal (Y5).

Figure 4:
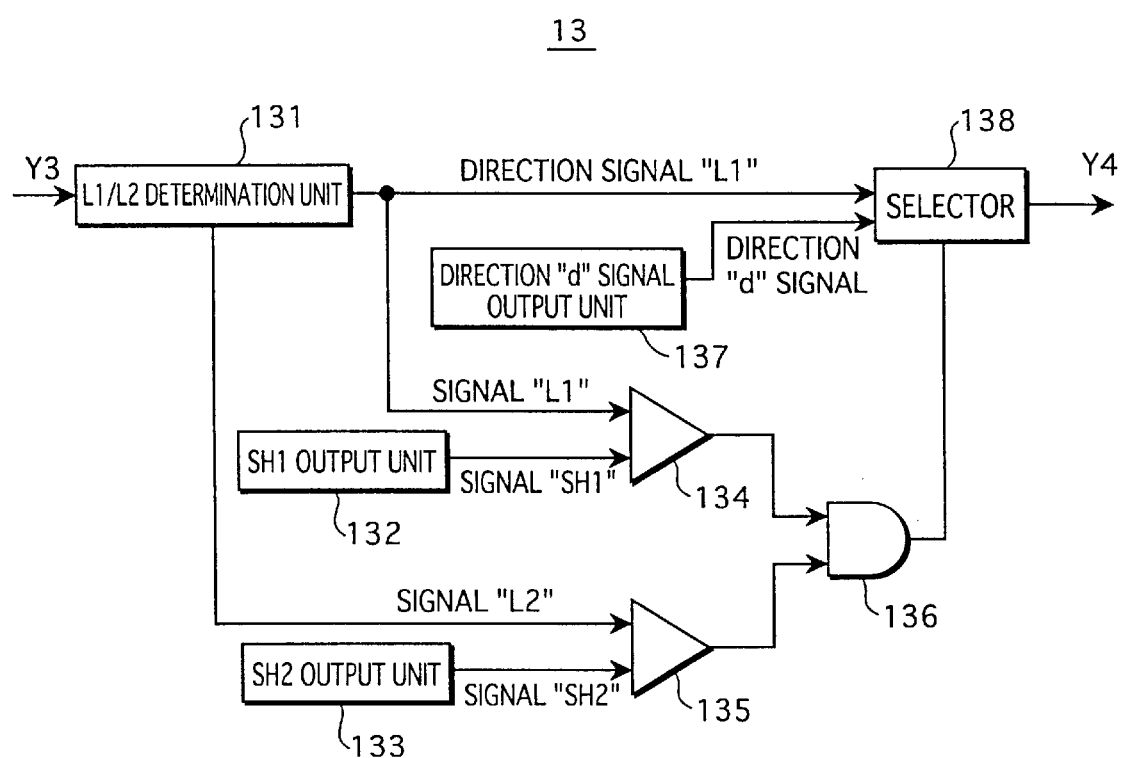
FIG. 4 is a block diagram showing a circuit construction of a correlation direction detection circuit in the pixel difference detection circuit.

FIG. 4 is a block diagram showing a circuit construction of the correlation direction detection circuit 13.

As the figure shows, the correlation direction detection circuit 13 includes an L1/L2 determination unit 131, an SH1 output unit 132, an SH2 output unit 133, comparators 134 and 135, an AND-circuit 136, a direction "d" signal output unit 137, and a selector 138.

The L1/L2 determination unit 131 determines the value "L1" and the value "L2" using the pixel difference detection signal (Y3). The L1/L2 determination unit 131 then outputs, based on its determination result, a signal indicating a direction corresponding to the value "L1" (a direction signal "L1") to the selector 138. Also, the L1/L2 determination unit 131 outputs a signal indicating the value "L1" (a signal "L1") to the comparator 134, and a signal indicating the value "L2" (a signal "L2") to the comparator 135.

Figure 5:
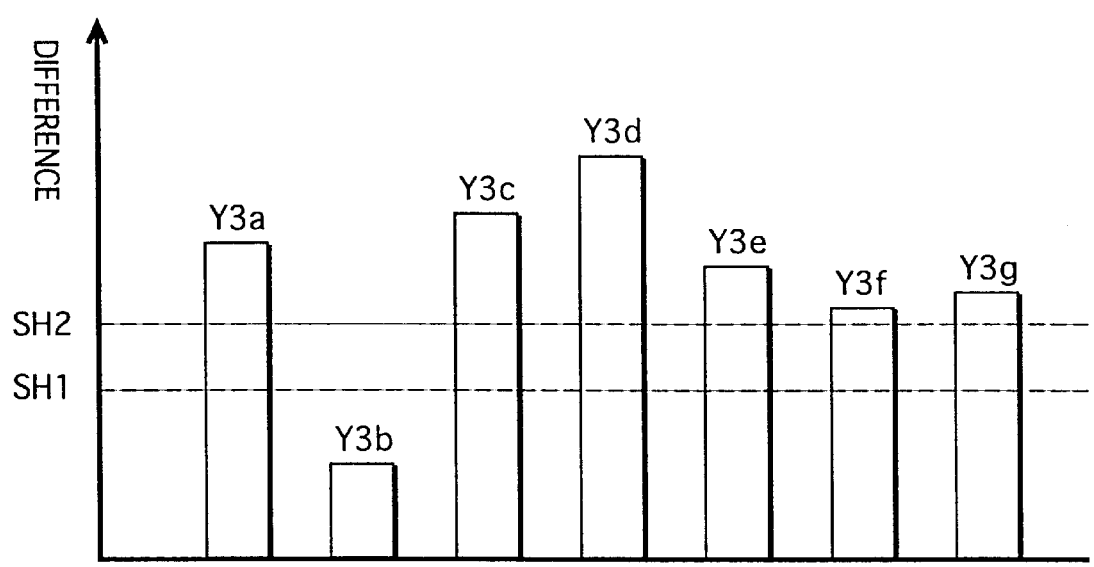
FIG. 5 shows examples of pixel luminance differences in directions "a" to "g" with respect to an interpolation pixel "H5"

In the example of the luminance differences shown in FIG. 5 (where "Y3a" to "Y3g" are luminance differences respectively corresponding to the directions "a" to "g"), "Y3b" is determined as the value "L1", and "Y3f" is determined as the value "L2". Accordingly, the direction signal "L1" indicates the direction "b", the signal "L1" indicates a luminance difference corresponding to the direction "b", and the signal "L2" indicates a luminance difference corresponding to the direction "f".

Figure 6:
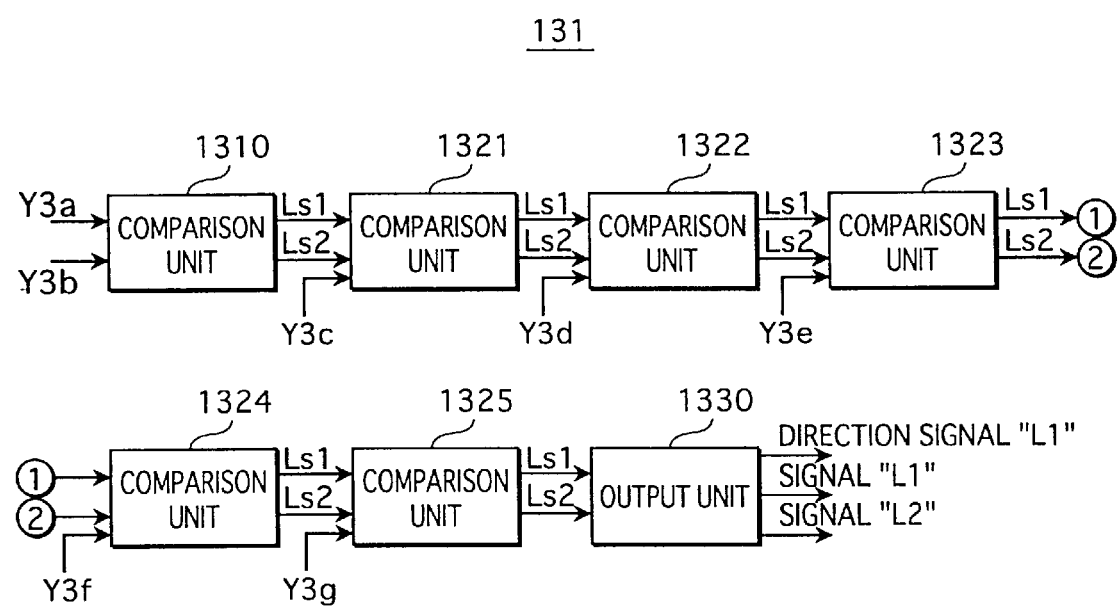
FIG. 6 shows a construction of an L1/L2 determination unit in the correlation direction detection circuit.
Figure 7:
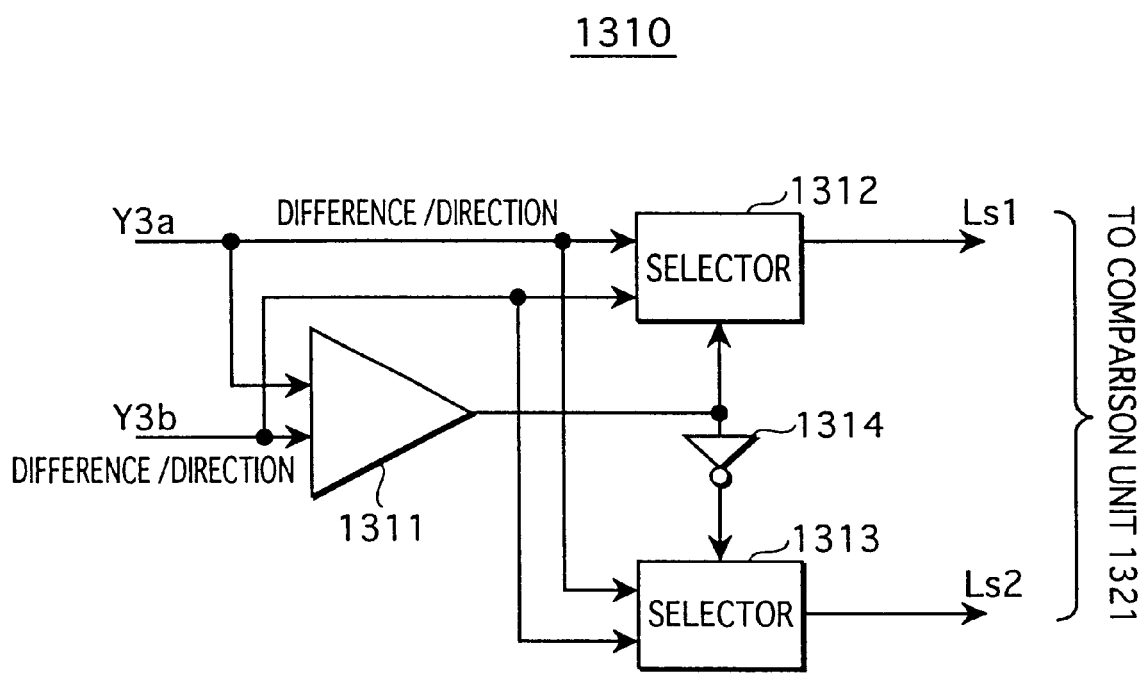
FIG. 7 shows a circuit construction of a comparison unit in the L1/L2 determination unit.
Figure 8:
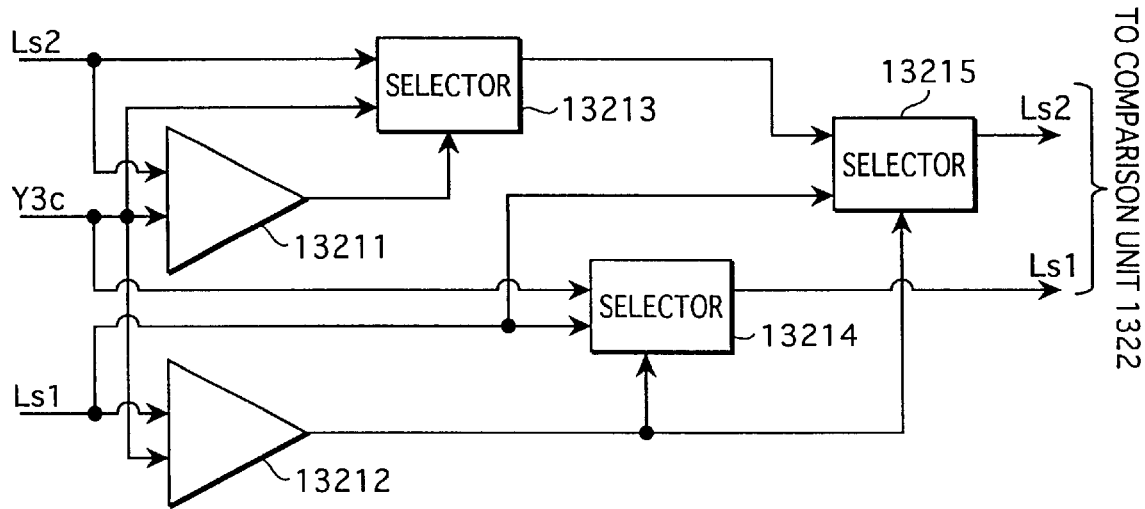
FIG. 8 shows a circuit construction of another comparison unit in the L1/L2 determination unit.

The following describes the constructions of the L1/L2 determination unit 131, with reference to FIGS. 6 to 8.

FIG. 6 is a block diagram showing a circuit construction of the L1/L2 determination unit 131.

As the figure shows, the L1/L2 determination unit 131 includes a comparison unit 1310, comparison units 1321 to 1325, and an output unit 1330. The comparison units 1321 to 1325 share the same basic construction.

FIG. 7 shows a circuit construction of the comparison unit 1310.

As the figure shows, the comparison unit 1310 includes a comparator 1311, selectors 1312 and 1313, and an inverter 1314. The inverter 1314 inverts a signal level.

In the pixel difference detection signal (Y3), the signal "Y3a" and the signal "Y3b" are inputted into the comparison unit 1310. As described above, the signal "Y3a" includes a signal indicating a luminance difference corresponding to the direction "a" and a signal indicating the direction "a", whereas the signal "Y3b" includes a signal indicating a luminance difference corresponding to the direction "b" and a signal indicating the direction "b".

The comparator 1311 compares (a) the luminance difference corresponding to the direction "a" (a difference "a") and (b) the luminance difference corresponding to the direction "b" (a difference "b"). The comparator 1311 outputs "1" when judging the difference "b">the difference "a", and outputs "0" when judging the difference "b"≦the difference "a".

The selectors 1312 and 1313 are circuits for selecting and outputting one of the two signals inputted therein according to the value of the output signal of the comparator 1311.

When the value outputted from the comparator 1311 is "0", the selector 1312 outputs the signal "Y3b" and the selector 1313 outputs the signal "Y3a". When the value outputted from the comparator 1311 is "1", the selector 1312 outputs the signal "Y3a" and the selector 1313 outputs the signal "Y3b". This means that a signal with a smaller luminance difference value is outputted from the selector 1312, and a signal with a larger luminance difference is outputted from the selector 1313. This enables the judgment as to which one of the luminance differences of pixels in the directions "a" or "b" is larger. In the case of the example shown in FIG. 5, the signal "Y3b" is outputted from the selector 1312, and the signal "Y3a" is outputted from the selector 1313. For ease of explanation here, the signal outputted from the selector 1312 is referred to as the signal "Ls1", and the signal outputted from the selector 1313 is referred to as the signal "Ls2".

FIG. 8 shows a circuit construction of the comparison unit 1321.

As the figure shows, the comparison unit 1321 includes comparators 13211 and 13212, and selectors 13213, 13214, and 13215.

The signals "Ls2" and "Ls1" outputted from the comparison unit 1310, and the signal "Y3c" are inputted into the comparison unit 1321.

The comparator 13211 compares (a) a luminance difference corresponding to the direction "c" (a difference "c") and (b) a luminance difference included in the signal "Ls2" (a difference "Ls2"). Te comparator 13211 outputs "1" when judging the difference "c">the difference "Ls2", and outputs "0" when judging the difference "c"≦the difference "Ls2".

The comparator 13212 compares (a) the difference "c" and (b) a luminance difference included in the signal "Ls1" (a difference "Ls1"). The comparator 13212 outputs "1", when judging the difference "c">the difference "Ls1", and outputs "0" when judging the difference "c">the difference "Ls1".

The selector 13213 outputs the signal "Y3c" as it is when the value outputted from the comparator 13211 is "0", and outputs the signal "Ls2" as it is when the value outputted from the comparator 13211 is "1".

The selector 13214 outputs the signal "Y3c" to the comparison unit 1322 when the value outputted from the comparator 13212 is "0", and outputs the signal "Ls1" to the comparison unit 1322 when the value outputted from the comparator 13212 is "1".

The selector 13215 outputs the signal "Ls1" to the comparison unit 1322 when the value outputted from the comparator 13212 is "0", and outputs the output signal from the selector 13213 to the comparison unit 1322 when the value outputted from the comparator 13212 is "1".

By comparing the values "Ls1" and "Ls2" each with the difference "c" in the above described way, the direction with the smallest value can be outputted as the signal "Ls1" and the direction with the second smallest value can be outputted as the signal "Ls2", out of the directions "a", "b", and "c".

Referring back to FIG. 6, the signal "Y3d", and the signals "Ls1", "Ls2" outputted from the comparison unit 1321 (the signals "Y3b" and "Y3a" in the example in FIG. 5) are inputted into the comparison unit 1322. Of these signals, a signal corresponding to a direction with the smallest value and a signal corresponding to a direction with the second smallest value are outputted to the comparison unit 1323 as new signals "Ls1" and "Ls2" (signals "Y3b" and "Y3a" in the example of FIG. 5).

By the comparison units 1323, 1324, and 1325 sequentially executing the above described processing, a signal corresponding to a direction with the smallest value of the signals "Y3a" to "Y3g" is outputted as the signal "Ls1" and a signal corresponding to a direction with the second smallest value is outputted as the signal "Ls2". In the example in FIG. 5, the signal "Y3b" is outputted as the signal "Ls1", and the signal "Y3f" is outputted as the signal "Ls2".

The output unit 1330 outputs a signal indicating a luminance difference of the signal "Ls1" as the signal "L1", and a signal indicating the direction of the signal "Ls1" as the direction signal "L1", and outputs a signal indicating a luminance difference of the signal "Ls2" as the signal "L2".

Referring back to FIG. 4, the SH1 output unit 132 outputs a signal indicating a first threshold (SH1) that is set in advance, as a signal "SH1" to the comparator 134. Here, the first threshold (SH1) corresponds to "SH1" in FIG. 5.

The comparator 134 compares (a) the value "L1" indicated by the signal "L1" and (b) the first threshold "SH1". The comparator 134 outputs "1" when judging L1<SH1, and outputs "0" when judging L1≧SH1, to the AND-circuit 136. In the example shown in FIG. 5, as Y3b(=L1)<SH1, the comparator 134 outputs "1".

The SH2 output unit 133 outputs a signal indicating a second threshold (SH2, where SH1<SH2) that is set in advance, as a signal "SH2" to the comparator 135. Here, the second threshold "SH2" corresponds to "SH2" in FIG. 5.

The comparator 135 compares (a) the value "L2" indicated by the signal "L2" and (b) the second threshold "SH2". The comparator 135 outputs "1" when judging L2>SH2, and outputs "0" when judging L2≦SH2, to the AND-circuit 136. In the example shown in FIG. 5, as Y3f(=L2)>SH2, the comparator 135 outputs "1".

The AND-circuit 136 outputs "1" when "1" is outputted from the comparators 134 and 135, and outputs "0" in the other cases, to the selector 138. In the example shown in FIG. 5, the AND-circuit 136 outputs "1".

The direction "d" signal output unit 137 outputs a signal indicating the direction "d" (a direction "d" signal), out of the above-mentioned directions "a" to "g", to the selector 138.

The selector 138 outputs the direction signal "L1" as a correlation direction signal "Y4" when the signal from the AND-circuit 136 is "1". In this case, the direction with the smallest luminance difference is set as the correlation direction.

Alternatively, when the signal from the AND-circuit (3) L1≧SH1 and L2≦SH2), the selector 138 outputs, as the correlation direction signal (Y4), the direction "d" signal outputted from the direction "d" output unit 137. In this case, the direction "d" is set as the correlation direction. In the example in FIG. 5, as the value "1" is outputted from the AND-circuit 136, the direction "b" is set as the correlation direction.

To be more specific, a direction with the smallest luminance difference (hereafter referred to as a direction "L1") is set as the correlation direction when the following condition-1 is satisfied. When the condition-1 is not satisfied (in either case of (1) L1≧SH1, (2) L2≦SH2, or (3) L1≧SH1 and L2≦SH2 as described above), the direction "d" is always set as the correlation direction.

Condition-1

L1<SH1; and

L2<SH2

The direction to be set as the correlation direction is changed depending on whether the condition-1 is satisfied or not, to minimize a noise influence on generation of an interpolation signal. The following describes the reason for this in more detail.

(1) When luminance differences of pixel pairs in a plurality of directions (seven directions in the present embodiment) with respect to an interpolation pixel are calculated, the resulting values have the following tendency. A luminance difference in one direction is usually much smaller than luminance differences in the other directions except when the interpolation pixel is in an image area with almost uniform luminance like in a white image. This means that two different directions are unlikely to be candidates for the correlation direction. This tendency increases especially when the interpolation pixel is positioned at an edge part of an image. Referring now to FIG. 3, suppose that the pixels "B3" to "B9" and the pixels "A7" to "A9" are black, and the pixels "B1", "B2", and pixels "A1" to "A6" are white (the edge extends in the direction "b"). In this case, the interpolation pixel "H5" is at the edge part of the black image. Assuming the luminance of a white pixel to be "200" and the luminance of a black pixel to be "0", a luminance difference between two pixels in the direction "b" (a luminance value of the pixel "B3"—a luminance value of the pixel "A7") is calculated as "0". Luminance difference values in the other directions, in contrast, are calculated as "200". In this way, the luminance difference value in one direction is normally much smaller than luminance differences in the other directions.

(2) The inventors of the present application have directed their attention to this tendency, and discovered the following phenomenon. When luminance differences in two directions are considerably small and luminance differences in the other directions are relatively large, like when luminance differences in the directions "b" and "g" are considerably small but luminance differences in the directions "a", "c", "d", "e", and "f" are relatively large, it is highly likely that luminance of at least one of the pixels "B3", "A7", "B8", and "A2" in the two directions "b" and "g" has been influenced by noise and is different from what is supposed to be.

Conventionally, even when the pixel is highly likely to have been influenced by noise, i.e., when the pixel may not be actually correlated with the interpolation pixel, the direction "L1" has always been set as the correlation direction, and the interpolation pixel has been generated based on the pixels in that correlation direction. Therefore, imprecise interpolation has been performed in some cases, with the interpolation contrarily deteriorating an image quality.

If diagonal directions rather than the vertical direction, in particular, the directions "a", "b", "f", and "g" are mistakenly set as the correlation direction, an interpolation signal is generated based on pixels greatly distant from the interpolation pixel "H5". The pixels being greatly distant from the interpolation pixel "H5" often means, when these pixels are actually not correlated with the interpolation pixel (H5), that the luminance of the pixels greatly differ from the pixels actually correlated with the interpolation pixel "H5". If an interpolation signal is generated based on such pixels that are not correlated with the interpolation pixel "H5", the generated signal greatly differs from the one to be generated based on the pixels correlated with the interpolation pixel. This greatly increases deterioration of the image quality.

As described above, although interpolation using pixels in a diagonal direction may improve an image quality if performed precisely, such interpolation may contrarily deteriorate an image quality to a greater extent if performed imprecisely.

(3) In view of the above phenomenon, the inventors of the present application have imposed a predetermined limitation (here, a limitation by the above condition-1) to determination of the correlation direction as follows. When the condition-1 is not satisfied, the obtained correlation direction is considered unreliable, and so the direction of a line that links the pixels "B5" and "A5" closest to the interpolation pixel "H5", which is the vertical direction, is detected as the correlation direction. In other words, the inventors have tried to minimize deterioration of the image quality, by preventing interpolation with a pixel in a diagonal direction with respect to the interpolation pixel whose luminance is highly likely to have been influenced by noise. The correlation direction is considered reliable when the condition-1 is satisfied, and an interpolation signal is generated based on pixels positioned in this correlation direction. By doing so, precise interpolation is ensured and an image quality can be improved further.

(4) For determining the correlation direction with the method described above, the importance lies in values of the thresholds "SH1" and "SH2", and the difference between these values. If the threshold "SH1" is too low or the threshold "SH2" is too high, interpolation using pixels in a diagonal direction (hereafter referred to as "diagonal interpolation") is performed only when its luminance difference is extremely large as in the above-described black and white image example where the luminance greatly varies within the image. That is to say, the diagonal interpolation is too restricted to be performed. Further, the difference between the threshold "SH1" and the threshold "SH2" being too large means that the threshold "SH2" is too high, resulting in the same problem. On the contrary, when the difference between the threshold "SH1" and the threshold "SH2" is too small, the diagonal interpolation is performed even when the difference between the value "L1" and the value "L2" is only subtle. This means that the diagonal interpolation is performed with the possibility of noise influence being high.

(5) The inventors of the present application have examined appropriate values for the threshold "SH1" and the threshold "SH2", and the difference between the threshold "SH1" and the threshold "SH2", to enable diagonal interpolation to be performed without excessive restrictions and less influence by noise. The inventors have conducted several experiments using various values for the thresholds "SH1" and "SH2" and using various patterned images, to obtain the above appropriate values.

The experimental results give the following conclusions. It is preferable to set the threshold "SH1" at several to 10% of a value that yielded the largest luminance difference (referred to as the "largest difference", for example, "256" when the luminance is expressed in 256 gradations), and to set the difference between the threshold "SH1" and the threshold "SH2" at several to 10% of the largest difference. It is particularly preferable to set the threshold "SH1" in a range of 5 to 10% of the largest difference, and the difference between the threshold "SH1" and the threshold "SH2" at 5% or more of the largest difference. Here, the threshold "SH1" is set at approximately 10%, and the difference between the threshold "SH1" and the threshold "SH2" is set at approximately 5%.

Note that when the interpolation pixel "H5" is positioned in an image area with almost uniform luminance like in a white image, the luminance difference in each direction is small and often similar. In this case, the vertical direction is detected as the correlation direction.

As described above, the correlation direction is determined depending on whether the condition-1 is satisfied or not in the present embodiment. Therefore, generation of an interpolation signal is less likely to be influenced by noise, thereby preventing deterioration of an image quality.

Note that the present embodiment involves the processing, for one interpolation pixel, to: (1) calculate a luminance difference between two pixels respectively on the first line and the second, line in each direction, (2) detect a direction with the smallest luminance difference as a correlation direction, (3) determine pixels on the first and second lines positioned in the detected correlation direction, and (4) generate an interpolation value for the interpolation pixel, based on the determined pixels. The present invention, however, should not be limited to such, as long as a pair of pixels to be used for generating the interpolation value can be determined. For example, the circuit may be constructed to execute the processing to: (1) calculate a luminance difference between two pixels in each direction, (2) determine, as a pixel pair used to generate the interpolation value, a pixel pair with the smallest luminance difference when the above condition-1 is satisfied, and a pixel pair positioned in the direction "d" when the above condition-1 is not satisfied, and (3) generate the interpolation value based on the determined pixel pair (this processing excluding the above detection of the correlation direction).

Also, it is needless to say that the circuit constructions of the correlation direction detection circuit 13 and the other components should not be limited to those described above, as long as they have the same functions. The same also applies to the following embodiments.

(Second Embodiment)

In the first embodiment, a direction corresponding to the value "L1" is set as the correlation direction when the condition-1 (L1<SH1, L2<SH2) is satisfied. In the second embodiment, however, diagonal interpolation is performed when (1) L1<SH1, (2) a direction corresponding to the value "L1" and a direction corresponding to the value "L2" are adjacent, and (3) the third smallest luminance difference (L3)>SH2. This is the only difference between the first and second embodiments. As being different from the first embodiment only in the construction of the correlation direction detection circuit, the second embodiment is described focusing on the construction of the correlation direction detection circuit. The other components that are the same as in the first embodiment are not described here.

Figure 9:
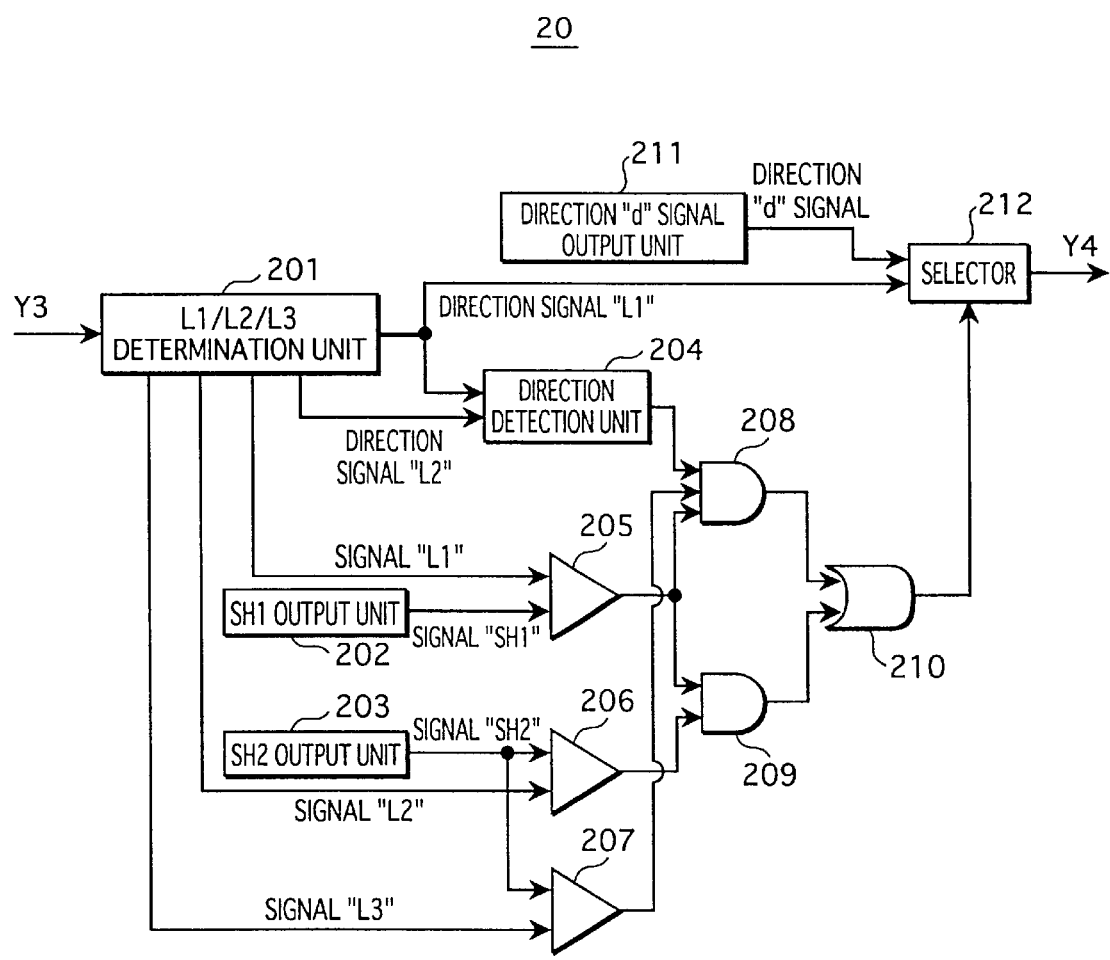
FIG. 9 shows a circuit construction of a correlation direction detection circuit in a second embodiment of the present invention.

FIG. 9 shows a circuit construction of the correlation direction detection circuit 20 in the present embodiment.

As the figure shows, the correlation direction detection circuit 20 includes an L1/L2/L3 determination unit 201, an SH1 output unit 202, an SH2 output unit 203, a direction detection unit 204, comparators 205, 206, and 207, AND-circuits 208 and 209, an OR-circuit 210, a direction "d" signal output unit 211, and a selector 212.

Here, the SH1 output unit 202, the SH2 output unit 203, and the direction "d" signal output unit 211 are respectively the same as the SH1 output unit 132, the SH2 output unit 133, and the direction "d" signal output unit 137 in the first embodiment.

The L1/L2/L3 determination unit 201 outputs a signal "L1", a signal "L2", a signal "L3", a direction signal "L1", and a direction signal "L2". Here, the signal "L1", the signal "L2", and the direction signal "L1" are the same as in the first embodiment, and these signals are generated using the circuits shown in FIGS. 6, 7, and 8. Also, the direction signal "L2" indicates a direction with the second smallest luminance difference. Here, the direction signal "L2" is set as follows. In FIG. 6, the output unit 1330 outputs a signal indicating the direction with the second smallest luminance difference included in the signal "Ls2" outputted from the comparison unit 1325. The outputted signal is then set as the direction signal "L2". The direction indicated by the direction signal "L2" is hereafter referred to as the direction "L2". In the case of luminance differences ("Y3a" to "Y3g") in the directions "a" to "g" with respect to the interpolation pixel "H5" in FIG. 10, "Y3b" is determined as the value "L1" and "Y3c" is determined as the value "L2", and therefore, the direction "L1" is the direction "b" and the direction "L2" is the direction "c".

On the other hand, the signal "L3" indicates the third smallest luminance difference. A circuit for generating the signal "L3" is not shown here, but it is a logical circuit constructed to realize the following processing. First, every two of the luminance differences indicated by the signals "Y3a", "Y3b", and "Y3c" are compared. Next, the luminance difference indicated by the signal "Y3d" are sequentially compared with the differences indicated by the signals "Y3a", "Y3b", and "Y3c" resulting that have been compared. From this comparison, a direction with the third smallest luminance difference is determined, and the value for the determined direction is outputted. This circuit can be readily realized, for example, by modifying the circuit shown in FIG. 8. To be more specific, the number and arrangement of the comparators and selectors should be changed in such a manner that four values are inputted into the circuit and the smallest, the second smallest, and the third smallest values of the four are outputted therefrom. In the example in FIG. 10, a signal indicating the luminance difference in the direction "g" is outputted as the signal "L3".

The direction detection unit 204 receives the direction signal "L1" and the direction signal "L2" from the L1/L2/L3 determination unit 201, and judges whether the direction "L1" and the direction "L2" are adjacent or not. The term "directions are adjacent" here intends to mean that two directions out of a plurality of directions are positioned adjacent to each other. In FIG. 3, the adjacent two directions are: the directions "a" and "b", the directions "b" and "c", . . . and the directions "f" and "g". As one example, this judgment can be performed as follows. Setting a predetermined value at each direction, for example, setting "10" at the direction "a", "11" at the direction "b", . . . and "17" at the direction "g", a difference between the set value indicating the direction signal "L1" and the set value indicating the direction signal "L2" is calculated. When the difference (absolute value) is "1", the two directions are judged to be adjacent. When the difference is not "1", the two directions are judged not to be adjacent. This judgment method is realized by constructing a logical circuit to calculate the above difference.

Figure 10:
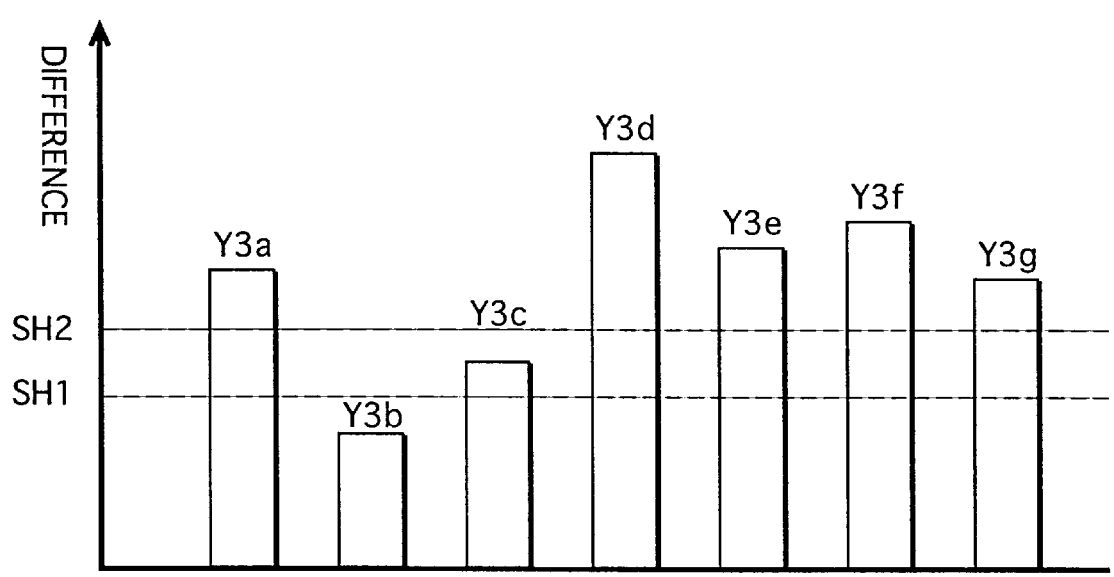
FIG. 10 shows examples of pixel luminance differences in directions "a" to "g" with respect to an interpolation pixel "H5"

In the example shown in FIG. 10, the direction "L1" is the direction "b", and the direction "L2" is the direction "c". According to the above, these two directions are judged to be adjacent. The direction detection unit 204 outputs a signal indicating "1" when judging that the direction "L1" and the direction "L2" are adjacent, and outputs a signal indicating "0" when judging that the two directions are not adjacent.

The operations of the circuit part constructed by the SH1 output unit 202, the SH2 output unit 203, and the comparators 205 and 206 are the same as in the first embodiment.

The comparator 207 compares the value "L3" indicated by the signal "L3" and the value "SH2" indicated by the signal "SH2". The comparator 207 outputs "1" when L3>SH2, and outputs "0" when L3≦SH2.

In this circuit construction, the OR-circuit 210 outputs "1" to the selector 212 when the signal outputted from the AND-circuit 208 is "1" (i.e., when L1<SH1, the directions "L1" and "L2" are adjacent, and L3>SH2).

The OR-circuit 210 outputs a signal identical to the signal from the AND-circuit 209 to the selector 212 when the signal outputted from the AND-circuit 208 is "0" (i.e., when L1≧SH1, the directions "L1" and "L2" are not adjacent, or L3≦SH2). In this case, the same operation as in the first embodiment is performed. That is to say, the OR-circuit 210 outputs a signal indicating "1" when the condition-1 is satisfied, and outputs a signal indicating "0" when the condition-1 is not satisfied.

When receiving the signal indicating "1" from the OR-circuit 210, the selector 212 outputs the direction signal "L1" as the correlation direction signal "Y4". When receiving the signal indicating "0" from the OR-circuit 210, the selector 212 outputs the direction "d" signal as the correlation direction signal "Y4". In the example in FIG. 10, the selector 212 outputs a signal indicating the direction "b".

As described above, in the present embodiment, the direction "L1" is set as the correlation direction only when the following condition-2 is satisfied.

Condition-2

L1<SH1;

the directions "L1" and "L2" are adjacent; and

L3>SH2

This condition is employed in the present embodiment due to the following discovery from the experimental results. The discovery is that pixels in the direction "L1" are highly likely to have a closer correlation with an interpolation pixel when the directions "L1" and "L2" are adjacent and the value "L3" is greater than the threshold "SH2" in an actual image. When the condition-2 is satisfied, it is highly likely that the direction "L1" (the direction "b" in FIG. 10) is a correct correlation direction. Therefore, in this case, the possibility of noise influence is eliminated and the direction "L1" is set as the correlation direction. In the present embodiment, as the direction "L1" is set as the correlation direction even for such an image, an image quality can be improved further by interpolation.

The present embodiment also describes the case where the correlation direction is determined and pixels in the determined correlation direction are determined as pixels used to generate an interpolation pixel as in the first embodiment. The present invention, however, should not limited to such. For example, the circuit may be constructed to execute the processing, for one interpolation pixel, to: (1) calculate a luminance difference between two pixels in each direction, (2) determine, as a pixel pair used to generate an interpolation value for the interpolation pixel, (i) a pixel pair with the smallest luminance difference when the above condition-2 is satisfied, (ii) a pixel pair with the smallest luminance difference when the above condition-2 is not satisfied but the above condition-1 is satisfied, and (iii) a pixel pair positioned in the direction "d" when neither the above condition-2 nor the above condition-1 is satisfied, and (3) generate the interpolation value based on the determined pixels.

In this case, the two directions may be judged adjacent when a line that links two pixels in the direction "L1" and a line that links two pixels in the direction "L2" are adjacent. For example, the judgment may be performed as to whether a pixel on the first line in the direction "L1" and a pixel on the first line in the direction "L2" are adjacent or not.

(Third Embodiment)

The present embodiment describes an example of an I/P conversion apparatus that is a video signal processing apparatus including the interpolation circuit 1 to which the first embodiment relates.

Figure 11:
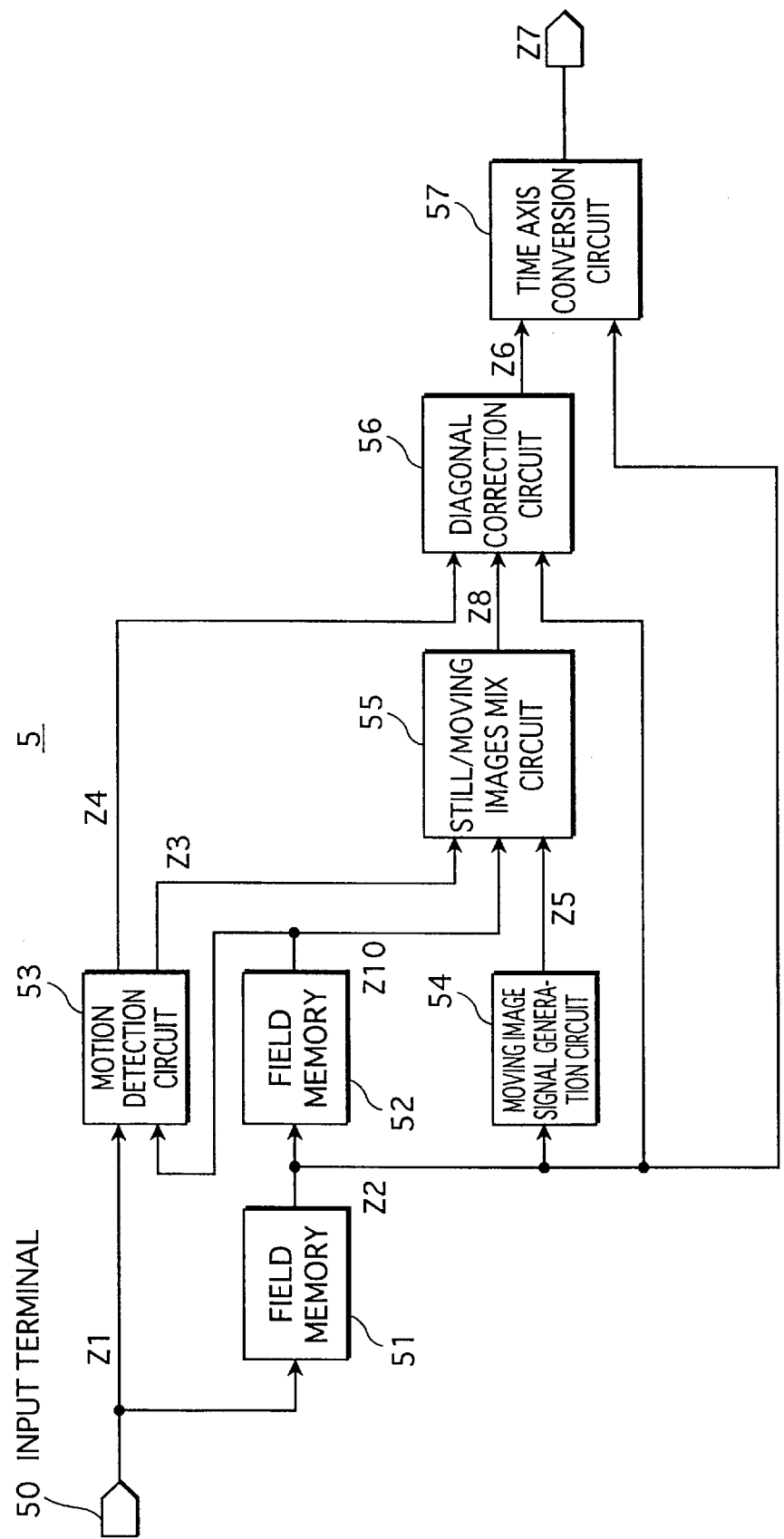
FIG. 11 shows a construction of an I/P conversion circuit in a third embodiment of the present invention.

FIG. 11 shows a construction of an I/P conversion apparatus 5 relating to the present embodiment.

As the figure shows, the I/P conversion apparatus 5 includes an input terminal 50, field memories 51 and 52, a motion detection circuit 53, a motion signal generation circuit 54, a moving video signal generation circuit 54, a still/moving images mix circuit 55, a diagonal correction circuit 56, and a time axis conversion circuit 57. It should be noted that the field memories 51 and 52, the motion detection circuit 53, the moving video signal generation circuit 54, the still/moving images mix circuit 55, and the time axis conversion circuit 57 are well known (for example, see Japanese published unexamined application H1-150708 etc.) and therefore, these circuits are only briefly described here.

An interlaced video signal (Z1) is inputted into the input terminal 50. The input video signal (Z2) is then transmitted to the field memory 51 and the motion detection circuit 53.

The field memory 51 delays the video signal (Z1) for a 1-field time period, and outputs the delayed signal. The output video signal (Z2) is synchronized with the input video signal, and therefore, the 1-line delay signal of each pixel is sequentially outputted in synchronization with the video signal (X1) of the corresponding pixel. The video signal (Z2) of the pixels is sequentially transmitted to the field memory 52, the moving video signal generation circuit 54, the diagonal correction circuit 56, and the time axis conversion circuit 57 in the outputted order.

The field memory 52 has the same construction as the field memory 51, and delays the input video signal (Z2) for another 1-field time period, and outputs the delayed signal. Assuming the video signal (Z2) outputted from the field memory 51 as a video signal of the n-th field, the video signal (Z1) inputted into the input terminal 50 is a video signal of the (n+1) th field, and the video signal (Z10) outputted from the field memory 52 is a video signal of the (n−1) th field. Note here that "n" is a positive integer. Note also that the interpolation pixel "H5" is assumed to be in the n-th field.

The motion detection circuit 53 detects the motion between two pixels that are respectively in the (n−1) th field and in the (n+1) th field and that are at the same position as the interpolation pixel "H5" in the n-th field. The motion detection circuit 53 outputs a signal indicating the degree of the detected motion as a motion detection signal (Z3), to the still/moving images mix circuit 55. This motion detection signal (Z3) is a signal indicating a level of the motion, out of a plurality of levels. As one example, five levels may be set to show the motion degree in an image, ranging from "complete still image" to "moving image with high motion".

Here, the motion detection circuit 53 judges whether the interpolation pixel "H5" is in either of (1) a still image area (2) a moving image area, by the degree of the detected motion. The motion detection circuit 53 outputs, as a diagonal control motion detection signal (Z4), a signal indicating "0" when judging that the pixel is in a still image area, and outputs a signal indicating "1" when judging that the pixel is in a moving image area, to the diagonal correction circuit 56.

The moving video signal generation circuit 54 averages the luminance of pixels "B5" and "A5" that are respectively on the first and second lines sandwiching the interpolation pixel "H5" and that are in the vertical direction with respect to the interpolation pixel "H5". The moving video signal generation circuit 54 then outputs the averaged value as a moving video signal (Z5) to the still/moving images mix circuit 55.

The still/moving images mix circuit 55 mixes the video signal (Z10) and the moving video signal (Z5) at a ratio according to a value of the motion detection signal (Z3), and outputs the resulting signal as an interpolation signal (Z8), to the diagonal correction circuit 56.

Specifically, the following procedures 1 to 4 are executed.

1. Obtain the luminance (P) of a pixel that is within the (n−1) th field and that is at the same position as the interpolates pixel "H5", from the video signal (Z10).

2. Obtain an average (Q) of the luminance of pixels "B5" and "A5" in the vertical direction with respect to the interpolation pixel "H5", from the moving video signal (Z5).

3. Obtain factors "k" and "m" (k+m=1) by which each value obtained in procedures 1 and 2 is to be multiplied, based on a value of the motion detection signal (Z3). As one example, when the motion detection signal (Z3) indicates a complete still image, K=1 and m=0 are obtained.

4. Obtain the interpolation signal (Z8) for the interpolation pixel "H5" using the equation "Z8=(k*P)+(m*Q)", and output the obtained value.

Figure 12:
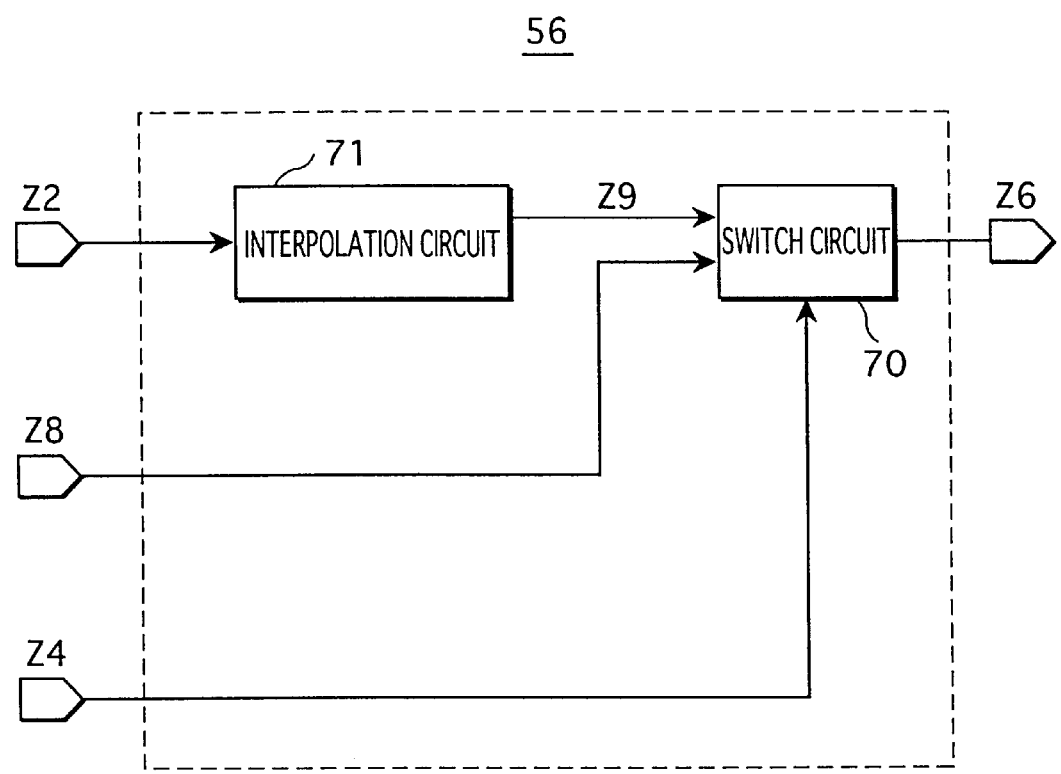
FIG. 12 shows a construction of a diagonal correction circuit.

As FIG. 12 shows, the diagonal correction circuit 56 includes a switch circuit 70 and an interpolation circuit 71.

The interpolation circuit 71 is the same as the interpolation circuit 1 in the first embodiment. The interpolation circuit 71 generates an interpolation signal (Z9) for the interpolation pixel "H5" in the n-th field, and outputs the generated interpolation signal (Z9).

The switch circuit 70 switches an output signal, based on a value of the diagonal control motion detection signal (Z4). To be more specific, the switch circuit 70 outputs, as an interpolation signal (Z6), the interpolation signal (Z9) from the interpolation circuit 71 when the diagonal control motion detection signal (Z4) is "1", and the interpolation signal (Z8) from the still/moving images mix circuit 55 when the diagonal control motion detection signal (Z4) is "0", to the time axis conversion circuit 57.

As described above, when the interpolation pixel "H5" is judged to be in a still image area, the interpolation signal (Z8) from the still/moving images mix circuit 55 is outputted. Therefore, as one example, when the interpolation pixel "H5" is judged to be in a complete still image, and values of the above factors are k=1 and m=0, the still image can be, reconstructed in an almost perfect manner using the a pixel that is within the (n−1)th field and that is at the same position as the interpolation pixel "H5".

Conventionally, interpolation has been performed using the interpolation signal (Z9) from the interpolation circuit 71 regardless of whether the interpolation pixel is in a still image area or in a moving image area. Accordingly, noise influence, if any, has caused an image quality to be deteriorated. The present embodiment offers a solution to preventing such image quality deterioration due to noise influence in a still image area.

Referring back to FIG. 11, the time axis conversion circuit 57 subjects on the video signal (Z2) in the n-th field and the interpolation signal (Z6) in the n-th field, to the time compressed integration process, and outputs the resulting signal as a progressive scanned video signal (Z7) in the n-th field.

As described above, in the present embodiment, an interpolation pixel is generated using a pixel that is in the (n−1)th field and that is at the same position as the interpolation pixel, instead of using an interpolation signal generated by the interpolation circuit when the interpolation pixel in the n-th field is judged to be in a still image area. This prevents deterioration of an image quality in a still image area.

(Modifications)

Although the present invention has been descried based on the above embodiments, it should not be limited to such. For example, the following modifications are available.

(1) Although the first embodiment describes the case where the direction "L1" is set as the correlation direction when the condition-1 is satisfied, the following condition-3 may be used instead of the condition-1.

Condition-3

L1<SH1; and

D<(L2−L1)

Here, "D" represents a minimum difference between the values "L1" and "L2" determined in advance when the direction "L1" is set as the correlation direction. With this condition-3, the correlation direction can be determined based on the actual difference between the values "L1" and "L2". Accordingly, when the condition-1 is not satisfied but the difference between the values "L1" and "L2" is relatively large (the above-described tendency), like when L1<SH1, the value "L1" is significantly small, L2<SH2, and the value "L2" is similar to the threshold "SH2", there are cases where the direction "L1" is detected as the correlation direction. This enables more precise judgment as to whether diagonal interpolation is appropriate or not.

(2) Although the above embodiments describe the case where a luminance difference is calculated as a difference between pixel values, other methods may be employed. For example, a color difference may be calculated as a difference between pixel values using a color difference signal.

Although the present invention has been fully described byway of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An interpolation apparatus that generates interpolation pixel values necessary for converting input video data of interlace scanning in to video data of progressive scanning, the interpolation apparatus comprising:

selection means for selecting, from pixels on adjacent two scan lines within one field of input video data, a plurality of candidate pixel-pairs, each of which is composed of two pixels that are symmetric with respect to a position of a pixel that is going to be interpolated;

calculation means for calculating a difference between pixel values of each selected candidate pixel-pair; and generation means for (a) determining, from the selected candidate pixel-pairs, a pixel-pair to be used for generating an interpolation pixel value of the pixel that is going to be interpolated, based on a smallest difference and a $2^{nd}$ smallest difference of the calculated differences, and (b) generating the interpolation pixel value, based on pixel values of the determined pixel-pair.

2. The interpolation apparatus of claim 1, wherein the generation means determines a pixel-pair with the smallest difference as the pixel-pair to be used, when the smallest difference is below a first threshold and the $2^{nd}$ smallest difference is above a second threshold that is higher than the first threshold.

3. The interpolation apparatus of claim 2, wherein the first threshold is a value not more than 10% of a maximum difference value determined in advance for a difference between pixel values.

4. The interpolation apparatus of claim 3, wherein a difference between the first threshold and the second threshold is a value not less than 5% of the maximum difference value.

5. The interpolation apparatus of claim 2, wherein the generation means determines a pixel-pair that is in a predetermined direction as the pixel-pair to be used, when the smallest difference is not less than the first threshold, or when the $2^{nd}$ smallest difference is not more than the second threshold.

6. The interpolation apparatus of claim 5, wherein the predetermined direction is a direction that is orthogonal to a scan line to be interpolated.

7. The interpolation apparatus of claim 1, wherein the generation means determines a pixel-pair with the smallest difference as the pixel-pair to be used, when the smallest difference is below a predetermined threshold and a difference between the smallest difference and the $2^{nd}$ smallest difference is above a predetermined value.

8. The interpolation apparatus of claim 7, wherein the generation means determines a pixel-pair that is in a predetermined direction as the pixel-pair to be used, when the difference between the smallest difference and the $2^{nd}$ smallest difference is not more than the predetermined value.

9. The interpolation apparatus of claim 8, wherein the predetermined direction is a direction that is orthogonal to a scan line to be interpolated.

10. The interpolation apparatus of claim 1, wherein the generation means determines the pixel-pair to be used for generating the interpolation pixel value, by further referring to (a) a first direction that is a direction of a straight line linking two pixels with the smallest difference and (b) a second direction that is a direction of a straight line linking two pixels with the $2^{nd}$ smallest difference.

11. The interpolation apparatus of claim 10, wherein the generation means determines a pixel-pair with the smallest difference as the pixel-pair to be used, when the smallest difference is below a first threshold, the first direction and the second direction are adjacent, and a $3^{rd}$ smallest difference of the calculated differences is above a second threshold that is higher than the first threshold.

12. The interpolation apparatus of claim 11, wherein the first threshold is a value not more than 10% of a maximum difference value determined in advance for a difference between pixel values.

13. The interpolation apparatus of claim 12, wherein a difference between the first threshold and the second threshold is a value not less than 5% of the maximum difference value.

14. The interpolation apparatus of claim 10, wherein the generation means determines a pixel-pair that is in a predetermined direction as the pixel-pair to be used, when the smallest difference is not less than the first threshold, when the first direction and the second direction are not adjacent, or when the $3^{rd}$ smallest difference is not more than the second threshold.

15. The interpolation apparatus of claim 14, wherein the predetermined direction is a direction that is orthogonal to a scan line to be interpolated.

16. The interpolation apparatus of claim 1, wherein the pixel values are luminance values.

17. The interpolation apparatus of claim 1, wherein the generation means includes:

a detection unit for detecting, as a correlation direction, a direction corresponding to a pixel-pair that has a highest correlation with the pixel that is going to be interpolated, based on the smallest difference and the $2^{nd}$ smallest difference; and a generation unit for (a) determining the pixel-pair corresponding to the detected correlation direction, as the pixel-pair to be used, and (b) generating the interpolation pixel value, based on pixel values of the determined pixel-pair.

18. An interpolation circuit that generates interpolation pixel values necessary for converting input video data of interlace scanning into video data of progressive scanning, the interpolation circuit comprising:

a calculation circuit for (a) selecting, from pixels on adjacent two scan lines within one field of input video data, a plurality of candidate pixel-pairs, each of which is composed of two pixels that are symmetric with respect to a position of a pixel that is going to be interpolated, and (b) calculating a difference between pixel values of each selected candidate pixel-pair;

a detection circuit for (c) detecting, as a correlation direction, a direction corresponding to a pixel-pair that has a highest correlation with the pixel that is going to be interpolated, based on a smallest difference and a $2^{nd}$ smallest difference of the calculated differences; and a generation circuit for (d) determining the pixel-pair corresponding to the detected correlation direction, as a pixel-pair to be used for generating an interpolation pixel value of the pixel that is going to be interpolated, and (e) generating the interpolation pixel value, based on pixel values of the determined pixel-pair.

19. A video signal processing apparatus that converts input video data of interlace scanning into video data of progressive scanning, the video signal processing apparatus comprising:

selection means for selecting, from pixels on adjacent two scan lines within one field of input video data, a plurality of candidate pixel-pairs, each of which is composed of two pixels that are symmetric with respect to a position of a pixel that is going to be interpolated;

calculation means for calculating a difference between pixel values of each selected candidate pixel-pair;

first generation means for (a) determining, from the selected candidate pixel-pairs, a pixel-pair to be used for generating an interpolation pixel value of the pixel that is going to be interpolated, based on a smallest difference and a $2^{nd}$ smallest difference of the calculated differences, and (b) generating the interpolation pixel value, based on pixel values of the determined pixel-pair;

second generation means for generating an interpolation pixel value of the pixel that is going to be interpolated, by referring to a pixel value of a pixel that corresponds to the pixel to be interpolated and that is in a field immediately preceding a present field to which the pixel to be interpolated belongs;

detection means for detecting a change in an image of the present field, by referring to the field immediately preceding the present field and a field immediately following the present field;

selection means for selecting, according to a detection result by the detection means, one of (c) the interpolation pixel value generated by the first generation means and (d) the interpolation pixel value generated by the second generation means; and output means for alternately outputting (e) scan lines interpolated using interpolation pixel values selected by the selection means and (f) scan lines of the input video data.

20. The video signal processing apparatus of claim 19, wherein the selection means (a) selects the interpolation pixel value generated by the second generation means, when judging that the pixel that is going to be interpolated is in a still image area according to the detection result, and (b) selects the interpolation pixel value generated by the first generation means, when judging that the pixel that is going to be interpolated is in a moving image area according to the detection result.

* * * * *